(12) United States Patent
Bowers et al.

(10) Patent No.: US 10,417,577 B2
(45) Date of Patent: Sep. 17, 2019

(54) MACHINE LEARNING SYSTEM INTERFACE

(71) Applicant: Facebook, Inc., Menlo Park, CA (US)

(72) Inventors: Stuart Michael Bowers, Menlo Park, CA (US); Hussein Mohamed Hassan Mehanna, Cupertino, CA (US); Alisson Gusatti Azzolini, San Francisco, CA (US); Jeffrey Scott Dunn, Seattle, WA (US); Rodrigo Bouchardet Farnham, Atherton, CA (US); James Robert Paton, Fremont, CA (US); Aleksandr Sidorov, Menlo Park, CA (US); Pamela Shen Vagata, Menlo Park, CA (US); Xiaowen Xie, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 572 days.

(21) Appl. No.: 14/732,501

(22) Filed: Jun. 5, 2015

(65) Prior Publication Data
US 2016/0358101 A1 Dec. 8, 2016

(51) Int. Cl.
*G06N 3/12* (2006.01)
*G06N 20/00* (2019.01)
*G06F 8/34* (2018.01)
*G06F 9/451* (2018.01)

(52) U.S. Cl.
CPC .............. *G06N 20/00* (2019.01); *G06F 8/34* (2013.01); *G06F 9/453* (2018.02); *G06N 3/12* (2013.01)

(58) Field of Classification Search
None
See application file for complete search history.

(56) References Cited

U.S. PATENT DOCUMENTS

| 9,135,559 | B1 | 9/2015 | Szeto et al. |
| 2009/0265290 | A1 | 10/2009 | Ciaramita et al. |
| 2010/0179855 | A1 | 7/2010 | Chen et al. |

(Continued)

OTHER PUBLICATIONS

Leroux, et al., A Genetic Programming Problem Definition Language Code Generator for the EpochX Framework, Proceedings of the Companion Publication of the 2014 Annual Conference on Genetic and Evolutionary Computation, 2014, pp. 1149-1154.*

(Continued)

*Primary Examiner* — Wilbert L Starks
(74) *Attorney, Agent, or Firm* — Fenwick & West LLP

(57) ABSTRACT

Some embodiments include an experiment management interface for a machine learning system. The experiment management interface can manage one or more workflow runs related to building or testing machine learning models. The experiment management interface can receive an experiment initialization command to create a new experiment associated with a new workflow. A workflow can be represented by an interdependency graph of one or more data processing operators. The experiment management interface enables definition of the new workflow from scratch or by cloning and modifying an existing workflow. The workflow can define a summary format for its inputs and outputs. In some embodiments, the experiment management interface can automatically generate a comparative visualization at the conclusion of running the new workflow based on an input schema or an output schema of the new workflow.

19 Claims, 9 Drawing Sheets

(56) References Cited

U.S. PATENT DOCUMENTS

| | | |
|---|---|---|
| 2012/0054040 A1 | 3/2012 | Bagherjeiran et al. |
| 2013/0191372 A1 | 7/2013 | Lee et al. |
| 2014/0108308 A1 | 4/2014 | Stout |
| 2014/0337096 A1 | 11/2014 | Gilad-Bachrach et al. |
| 2015/0106311 A1 | 4/2015 | Birdwell et al. |
| 2015/0379426 A1 | 12/2015 | Dirac et al. |
| 2016/0300156 A1 | 10/2016 | Bowers et al. |
| 2016/0358102 A1 | 12/2016 | Bowers et al. |
| 2016/0358103 A1 | 12/2016 | Bowers et al. |
| 2017/0017886 A1 | 1/2017 | Gao et al. |
| 2017/0076198 A1 | 3/2017 | Bowers et al. |
| 2017/0124486 A1 | 5/2017 | Chan et al. |
| 2017/0124487 A1 | 5/2017 | Szeto et al. |
| 2018/0004835 A1 | 1/2018 | Piechowicz |
| 2018/0004859 A1 | 1/2018 | Piechowicz et al. |
| 2018/0007145 A1 | 1/2018 | Piechowicz |

OTHER PUBLICATIONS

Leroux, et al., A Genetic Programming Problem Definition Language Code Generator for the EpochX Framework, Proceedings of the Companion Publication of the 2014 Annual Conference on Genetic and Evolutionary Computation, 2014, pp. 1149-1154 (Year: 2014).*

U.S. Appl. No. 14/684,041 by Bowers, S., et al., filed Apr. 10, 2015.

U.S. Appl. No. 14/732,509 by Bowers, S., et al., filed Jun. 5, 2015.

U.S. Appl. No. 14/732,513 by Bowers, S., et al., filed Jun. 5, 2015.

Demšar, Janez, et al. "Orange: data mining toolbox in Python." *The Journal of Machine Learning Research* 14.1 (2013): 2349-2353.

RapidMiner Studio Manual, 2014, [online], [retrieved on Aug. 13, 2015]. Retrieved from: <http://docs.rapidminer.com/downloads/RapidMiner-v6-user-manual.pdf>, 116 pages.

Microsoft Azure, "Machine Learning: Powerful cloud-based predictive analytics." [website], [retrieved on Aug. 13, 2015]. Retrieved from the internet: http://azure.microsoft.com/en-us/services/machine-learning/, 2014, 6 Pages.

U.S. Appl. No. 15/199,335 by Piechowicz, S., et al., filed Jun. 30, 2016.

U.S. Appl. No. 15/199,351 by Piechowicz, S., et al., filed Jun. 30, 2016.

U.S. Appl. No. 15/199,403 by Piechowicz, S., et al., filed Jun. 30, 2016.

U.S. Appl. No. 14/799,517 by Gao, T., et al., filed Jul. 14, 2015.

U.S. Appl. No. 14/851,336 by Jin, O., et al., filed Sep. 11, 2015.

Niu, F. et al., "HOGWILD!: A Lock-free Approach to Parallelizing Stochastic Gradient Descent", Computer Sciences Department, University of Wisconsin-Madison, Jun. 2011, pp. 1-22.

Non-Final Office Action dated Nov. 30, 2017 for U.S. Appl. No. 14/799,517 by Gao, T., et al., filed Jul. 14, 2015.

Non-Final Office Action dated Oct. 13, 2017 for U.S. Appl. No. 14/684,041 by Bowers, S., et al., filed Apr. 10, 2015.

Non-Final Office Action dated Sep. 25, 2017 for U.S. Appl. No. 14/732,513 for Bowers, S. filed Jun. 5, 2016.

* cited by examiner

FIG. 3

RUN PARAMETERS — 302

- Run Name: Iris_Dwight
- Tags: ui-created ✕
- Run Notes: let's try for a great decision tree

WORKFLOW PARAMETERS — 304

- Workflow Name: di.example.iris.IrisDecisionTreeWorkflow
- Input Arguments:
  ```
  1  [ {"example_arg": 1, "example_arg2": "arg value thats a string"
  2  } ]
  ```
  ≡ Show diff
- Flow Package: ○ Use production package: 180
  ● Use custom package:
  0144a70f790511e49bdd00002c9d090b4
- Version:

[Start workflow run] — 306

300

400

Providing an experiment management interface to present previous experiment workflows ran on a machine learning system
402

Creating a new experiment associated with a new workflow
404

Receiving one or more inputs to define the new workflow
406

Tracking a version history of the new workflow and/or associated data processing operators
408

Scheduling the new workflow for execution by a dynamic pool of computing devices
410

Rendering a visualization to facilitate analysis of the new experiment based on an input schema or an output schema of the new workflow
412

Updating the new experiment in the experiment repository with the output results of the new experiment and the visualization associated therewith
414

*FIG. 4*

| ID | Cloned From | Owner | Workflow | Name | Status | End Time | Start Time ▾ | Tags |
|---|---|---|---|---|---|---|---|---|
| 162819 | – | Dwight Crow | di.example.iris.IrisDecisionTreeWorkflow | Iris_Dwight | Running | – | 20 seconds ago | ui-created |
| 162806 | – | Dwight Crow | di.example.iris.IrisDecisionTreeWorkflow | – | Succeeded | 46 minutes ago | 47 minutes ago | – |

Displaying results 1– 24 out of 24 matches.

*FIG. 7B*

ACTIONS
- 732 — Clone Workflow
- 734 — View Workflow Source Code
- 736 — FBUrl
- 738 — ✕ Cancel workflow run

*FIG. 7C*

| Job Name | Message |
|---|---|
| ▸ fblearner_shared.di.example.iris.IrisDecisionTreeWorkflow ▸ | |
| ▸ fblearner_shared.train | INFO:fbpackage:Fetching package fblearner_flow:0144a70f79051100002c9d090b4<br>INFO:fbpackage:Downloading FBPackage fblearner_flow:0144a70511e49bd0002c9d090b4<br>INFO:fbpackage:Package successfully installed in /tmp/packages/.staging/c0150-b5ab-4e87-9c1b-59ac9dc71 |
| • • fblearner_shared.split | |

*FIG. 7D*

MACHINE LEARNING SYSTEM INTERFACE

CROSS-REFERENCES TO RELATED APPLICATIONS

This application is related to U.S. patent application Ser. No. 14/684,041, entitled "MACHINE LEARNING MODEL TRACKING PLATFORM," which was filed on Apr. 10, 2015; U.S. patent application entitled "MACHINE LEARNING SYSTEM FLOW AUTHORING TOOL" filed on the same day as the present application; and U.S. patent application entitled "MACHINE LEARNING SYSTEM FLOW PROCESSING" filed on the same day as the present application, all of which are incorporated by reference herein in their entirety.

BACKGROUND

"Big data" is a broad term for datasets so large or complex that traditional data processing applications are often inadequate. For example, a social networking system can run several application services that pertain to big data. The term "big data" also often refers to the use of predictive analytics or other methods to extract values from data. For example, analysis of datasets can find new correlations, trends, patterns, categories, etc. Such analyses rely on machine learning and often consumes a large amount of computational resources (e.g., memory capacity, processor capacity, and/or network bandwidth).

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set can respectively include pairs of input datasets and expected output datasets that correspond to the respective input datasets.

Various web-based or mobile applications often rely on machine learning models to process large and complex "big data" to provide application services (e.g., personalized or targeted application services) to a large number of users. There is frequently a need for higher accuracy and/or consistency models while the requirements of these models are ever evolving. Experiments involving the training and evaluation of these models nevertheless take time and are typically the manual burdens of one or more developers or analysts.

BRIEF DESCRIPTION OF THE DRAWINGS

FIG. 3 is an example screenshot of an experiment management interface illustrating an interactive screen to define a new workflow run, in accordance with various embodiments.

FIG. 4 is a flow chart illustrating a method of operating an experiment management engine, in accordance with various embodiments.

FIGS. 7B-7F are diagrams illustrating detailed portions of the interactive screen of FIG. 7A.

Figure 1:
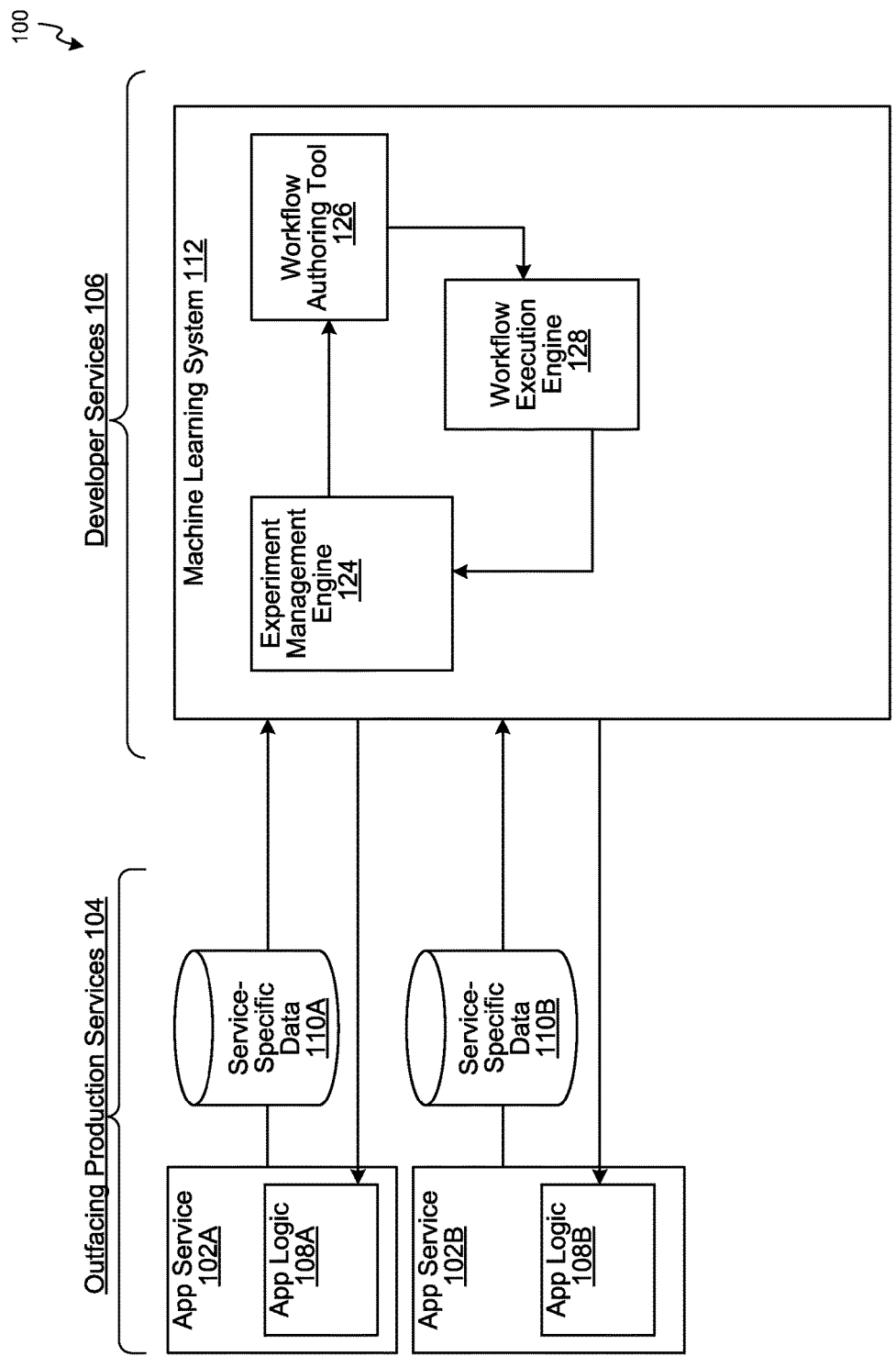
FIG. 1 is a block diagram illustrating a machine learning system, in accordance with various embodiments.

The figures show various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

A machine learning system can be implemented by one or more computing devices to facilitate design, execution, analysis, evaluation, and/or generation of machine learning related processes (e.g., pre-processing or post-processing machine learning data, training machine learning models, testing or experimenting with machine learning models, etc.). In several embodiments, the machine learning system can implement at least an experiment management engine, a workflow authoring tool, and a workflow execution engine. Several embodiments pertain to the user interface of the experiment management engine and/or toolsets to facilitate operating users (e.g., developers and/or analysts) to operate the machine learning system.

The machine learning system can include an authorship environment (e.g., implemented by the workflow authoring tool) and an execution platform (e.g., implemented by the workflow execution engine) for developers and analysts to build machine learning pipelines with automated dependency handling, front-end process management, and built-in components for various algorithms and output formats. The machine learning system advantageously enables machine learning in a computing system (e.g., an application service system and/or a social networking system) to be more reproducible and enables collaborative authorship and execution of machine learning processes and experiments.

Experiments and workflows can be managed via a user interface (UI) or an application programming interface (API). The UI and/or API can be executed on one or more dedicated computer tiers. For example, the UI enables an operating user to associate an experiment with one or more workflows for processing one or more input data sets into at one or more outputs. An "experiment" corresponds to a run instance of at least one workflow. An experiment can have experiment parameters. For example, the experiment parameters can be a run identifier (e.g., a title/description and/or a run sequence number), an indication of one or more workflows, an indication of one or more input parameters (e.g., input datasets, input data sources and/or input data configurations for the workflows, or any combination thereof. For example, the input data configurations can define which portion of an input dataset to use. In some embodiments, an experiment parameter is a workflow run parameter.

A "workflow" is an execution pipeline in a machine learning system to create, modify, evaluate, validate, and/or utilize one or more machine learning models (e.g., including pre-processing of input data and post-processing of output data from the machine learning models). A workflow, for example, can be composed of a directed graph (DG) of data processing operators and can have an associated output schema. In some embodiments, the DG can be acyclical. In some embodiments, the DG can include iterative feedback loops and/or recursion. During each workflow run/experiment, the workflow execution engine can programmatically generate the DG from a workflow definition (e.g., textual representation or other representative format of the workflow). In some cases, different workflow runs of the same workflow can have entirely different DGs. A workflow can inherit attributes from another workflow. In one example, all workflows can inherit attributes from a basic workflow. Workflows can accept one or more input parameters (e.g., functional arguments). Workflows can expose its data processing operators as members, elements of member lists, or elements of member dictionaries.

A workflow can utilize a pipeline of data processing operators and be configured to process one or more input datasets consistent with an input schema into one or more outputs consistent with an output schema. The input datasets can be passed in as or identified by at least one of the input parameters. In some embodiments, the DG of the data processing operators represent interdependencies of the data processing operators, where each directed edge represents an output of a data processing operator feeding into an input of another data processing operator. In several embodiments, more than one instance of a single data processing operator can be represented in the DG. For example, a data processing operator that normalizes a dataset can be used multiple times in the pipeline. In some embodiments, the input schema and the output schema are defined in the workflow. For example, the input schema is defined by a data processing operator at the front of the pipeline and the output schema is defined by a data processing operator at the end of the pipeline.

A data processing operator type is a computational unit. Instances of the data processing operator type can be scheduled to run on a single host device or a single operating environment (e.g., a virtual device) in an indivisible manner. Data processing operator types are the building blocks for workflows and are reusable across workflows. Different instances of the same data processing operator types can be used in the same workflow. Some operators can be used to run programmable scripts. For example, a "Bash" operator or an "R" operator which can be used to run an arbitrary bash script or R script respectively. Each data processing operator exposes an input schema defining one or more types of data it expects as its one or more inputs. Each data processing operator can also define an output schema defining one or more types of data it produces as its one or more outputs. Inputs to a data processing operator may be outputs from another data processing operator. The workflow execution engine can automatically handle scheduling data processing operators appropriately such that a data processing operator will not run until all of its inputs have been materialized by one or more data processing operators that produce them.

Data processing operators and/or workflows can expose output schemas describing the set of items they produce. In some embodiments, an input or output (I/O) schema can be associated with a serialization format. In some embodiments, each workflow with a defined output schema and corresponding serialization format can automatically upload its outputs according to the serialization format to a memoization database of operator outputs. This enables the machine learning system to automatically produce visualizations of outputs and reuse outputs that another data processing operator or workflow would otherwise have to re-calculate.

In some embodiments, a data processing operator defines an input summary format and an output summary format. In turn, the data processing operator at the front of the pipeline for a workflow can define the input summary format of the workflow. Likewise, the data processing operator at the end of the pipeline can define the output summary format of the workflow. An input summary format can describe the look and feel of a summary of the input datasets of the data processing operator and an output summary format can describe the look and feel of a summary of the outputs of the data processing operator.

When the machine learning system runs an experiment based on a workflow, the machine learning system can generate visualizations of the inputs and outputs of the experiment according to the input summary format and the output summary format. In some embodiments, the visualizations or representations of the visualizations are stored on the machine learning system and can be accessed by the user. In some embodiments, the visualizations are presented to the user automatically (e.g., when the visualizations are generated) as part of an experiment tracking dashboard. In some embodiments, the machine learning system sends the visualizations to one or more associated operating users of an experiment, in response to detecting that the experiment has finished running. The summary formats can describe to the machine learning system how to compute summary data, how to render the summary data, how to present the summary data (e.g., dimensionalities to present, whether to remove outliers, what colors to use, size of the visualization, etc.), in what form to render the data (e.g., a pie chart, a linear graph, a comparison table, etc.), and whether and/or how to sample the data prior to presentation.

A workflow can be executed repeatedly in different experiments. For example, the experiments can use different input datasets, input data sources (e.g., where the input datasets are live data that is dynamically evolving), and/or input data configuration (e.g., which row, column, feature, range, or parts of the input datasets to use). In some embodiments, an experiment can have multiple workflows.

The experiment management engine can provide a "clone and modify" option or a "new definition" option to define a new workflow and/or experiment. Under the clone and modify option, the user interface can present previous experiments and associated workflow(s) that ran on the machine learning system for the operating users to clone. The user interface can also present previous workflows that ran on the machine learning system for the operating user to clone. Responsive to a user selection of a previous workflow via the user interface, the experiment management engine clones the selected workflow and associated workflow attributes into the new workflow. Responsive to a user selection of a previous experiment via the user interface, the experiment management engine clones the selected experiment, associated experiment parameters, and associated workflow(s) into the new experiment. The user interface enables the operating user to modify any of the workflow attributes and the experiment parameters in the new workflow and/or the new experiment prior to running the new experiment or the new workflow.

Under the "new definition option," the user interface enables an operating user to define or configure a new workflow and/or a new experiment from scratch. The operating user can identify experiment parameters and/or workflow attributes on the user interface. The user interface can also present searchable experiment parameters and/or searchable workflow attributes for the operating user to select for the new experiment or workflow. After a new workflow is defined, the experiment management engine can add it to a workflow repository (e.g., workflows used in previous experiments) that can be sourced during a clone-and-modify creation of a subsequent experiment or workflow. The creation, modification, scheduling, execution, presentation, evaluation, analysis, and/or deployment of the experiments can be tracked in an experiment repository. After a new experiment is defined, the experiment management engine can add it to the experiment repository that can also be sourced during a clone-and-modify creation of a subsequent experiment.

Referring now to the figures, FIG. 1 is a block diagram illustrating an application service system 100, in accordance with various embodiments. The application service system 100 provides one or more application services (e.g., an application service 102A and an application service 102B, collectively as the "application services 102") to client devices over one or more networks (e.g., a local area network and/or a wide area network). The application service system 100 can provide the application services 102 via an application programming interface (API), a Web server, a mobile service server (e.g., a server that communicates with client applications running on mobile devices), or any combination thereof. In some embodiments, the application service system 100 can be a social networking system (e.g., the social networking system 502 of FIG. 5). The application services 102 can process client requests in real-time. The client requests can be considered "live traffic." For example, the application services 102 can include a search engine, a photo editing tool, a location-based tool, an advertisement platform, a media service, an interactive content service, a messaging service, a social networking service, or any combination thereof.

The application service system 100 can include one or more outfacing production services 104 that are exposed to the client devices, directly or indirectly, and one or more developer services 106 that are not exposed to the client devices. The developer services 106 can be used by operators of the application service system 100 to monitor, maintain, or improve the application services 102. In one example, at least one of the outfacing production services 104 can directly communicate with the client devices and respond to client requests from the client devices. In another example, a first outfacing production service can indirectly provide its service to the client devices by servicing a second outfacing production service. The second outfacing production service, in turn, can either directly provide its service to the client devices or provide its service to a third outfacing production service that directly provides its service to the client devices. That is, the outfacing production services 104 may be chained when providing their services to the client devices.

The application services 102 may be part of the outfacing production services 104. Each of the application services 102 can include an application logic module (e.g., executable code, binary, or script) that may be executed by a computer server (e.g., the computing device 600 of FIG. 6) hosting an application service. For example, the application service 102A can include an application logic module 108A and the application service 102B can include an application logic module 108B (e.g., collectively as the "application logic modules 108"). An application logic module provides the decision-making logic when responding to service requests (e.g., client requests or service requests from other application services). The service requests to the application logic modules and the corresponding responses generated by the application logic modules can be tracked and/or stored in a service-specific database. The service-specific database can also store metadata and/or analysis associated with each application service. For example, the application service 102A can maintain a service-specific data repository 110A and the application service 102B can maintain a service-specific data repository 110B. The service-specific data repositories 110A and 110B can be collectively referred to as "the service-specific data repositories 110."

In various situations, the decision-making logic can be improved over time via data analysis of user data in the service-specific data repositories 110. Several embodiments provides a machine learning system 112 that implements a platform to facilitate improvement of these decision-making logics via running machine learning experiments. These experiments can be based on real-time or aggregated user data in the service-specific data repositories 110. In several embodiments, the developer services 106 include the machine learning system 112. The machine learning system 112 provides a platform that facilitates big data experiments on the application service system 100. For example, the machine learning system 112 can include an experiment management engine 124, a workflow authoring tool 126, and a workflow execution engine 128.

The experiment management engine 124 can facilitate creation of new experiments. Each experiment can correspond to at least one workflow. A workflow can be defined by one or more data processing operators working together in a pipeline (e.g., represented by a directed acyclic graph) to process one or more input datasets into one or more outputs. The workflow can also define a summary format to facilitate analysis (e.g., comparative analysis, statistical analysis, evaluative analysis, or any combination thereof) of the outputs or the input datasets. For example, the summary format can describe how to post process the outputs to generate an illustrative presentation (e.g., an image, a table, a graph, or other media objects). In some embodiments, a workflow or a data processing operator in a workflow can define one or more resource constraints for running itself. The resource constraints can be defined by a user during creation of the workflow or the data processing operator or automatically estimated by the workflow authoring tool 126. The resource constraints, for example, can include a memory requirement (e.g., persistent data storage capacity requirement and/or run-time data storage capacity requirement), a processing power requirement, a network bandwidth requirement, or any combination thereof.

In some embodiments, the workflow authoring tool 126 can include or be coupled to an operator authoring tool to define or modify one or more data processing operators in a workflow. The workflow authoring tool 126 can provide a user interface such that an operating user can search and reference one or more known workflows, known data processing operators, and known resource constraints to associate with a workflow being authored.

The workflow authoring tool 126 facilitates compilation of a workflow. Here, "compilation of a workflow" does not necessarily refer to transforming a source code written in a programming language into a machine executable language. Rather, "compilation of the workflow" refers to the analysis of an arrangement of data processing operators to synthesize information that can be used by the workflow execution engine 128 to schedule distributed tasks to a pool of computing devices.

When an operating user finishes authoring a workflow, the workflow authoring tool 126 can compile the workflow into a workflow execution format manageable by the workflow execution engine 128. The workflow execution format can indicate analysis performed on the workflow by the workflow authoring tool 126. For example, as part of the compilation, the workflow authoring tool 126 can identify interdependencies amongst one or more data processing operators, flag potential inconsistencies in inputs or outputs of the data processing operators, identify one or more code packages associated with the data processing operators and interdependencies of the code packages, identify resource constraints for computing devices that will run the data processing operators, or any combination thereof.

The workflow execution engine 128 can facilitate execution of a workflow associated with an experiment. The workflow execution engine 128 can manage and schedule execution of code packages in accordance with the workflow execution format. For example, the workflow execution engine 128 can select computing devices to run data processing operators of the workflow, distribute code packages corresponding to the data processing operators, distribute references or links to input datasets of the workflow, and/or schedule execution of the code packages on the computing devices. The workflow execution engine 128 can also ensure load-balancing and resource consumption minimization when scheduling the workflow for execution on the selected computing devices (e.g., by managing the selection of the computing devices, distributing appropriate code packages, and/or streaming the input datasets or links thereto ahead of execution schedule while minimizing network bandwidth). The workflow execution engine 128 can schedule execution of the workflow by analysis of the workflow indicated in the workflow execution format to avoid bottlenecks, errors, and inconsistencies. The workflow execution engine 128 can also schedule the execution of the workflow based on statuses of currently running experiments, health data and operation states of the outfacing production services 104 (e.g., as a source of determining when input data will be available) and the developer services 106 (e.g., as entities potentially competing for the same computational resources), and/or scheduled execution times of scheduled experiments. For example, the workflow execution engine 128 can ensure that a data processing operator, which requires the output of another data processing operator to execute, is not executed in parallel with that other data processing operator.

In some embodiments, an experiment analytic interface may be generated by the experiment management engine 124. The experiment analytic interface can be part of the experiment management engine 124. The experiment analytic interface can present results of an experiment to operating users (e.g., developers or analysts) of the application service system 100. The results can be presented according to one or more summary formats defined by a workflow of the experiment.

A workflow of an experiment can include preprocessing of an input dataset, training a machine learning model, validating the machine learning model, processing a test dataset through the machine learning model to compute test results, post-processing the test results for analysis, or any combination thereof. In some examples, the workflow can include post-processing the input dataset for analysis. Post-processing for analysis can include computing statistical measures, computing comparative measures (e.g., between the test results and expected results), computing an evaluative measure (e.g., based on an evaluation algorithm), or any combination thereof.

Social Networking System Overview

Several embodiments of the application service system 100 utilize or are part of a social networking system. Social networking systems commonly provide mechanisms enabling users to interact with objects and other users both within and external to the context of the social networking system. A social networking system user may be an individual or any other entity, e.g., a business or other non-person entity. The social networking system may utilize a web-based interface or a mobile interface comprising a series of inter-connected pages displaying and enabling users to interact with social networking system objects and information. For example, a social networking system may display a page for each social networking system user comprising objects and information entered by or related to the social networking system user (e.g., the user's "profile").

Social networking systems may also have pages containing pictures or videos, dedicated to concepts, dedicated to users with similar interests ("groups"), or containing communications or social networking system activity to, from or by other users. Social networking system pages may contain links to other social networking system pages, and may include additional capabilities, e.g., search, real-time communication, content-item uploading, purchasing, advertising, and any other web-based inference engine or ability. It should be noted that a social networking system interface may be accessible from a web browser or a non-web browser application, e.g., a dedicated social networking system application executing on a mobile computing device or other computing device. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

As discussed above, a social graph can include a set of nodes (representing social networking system objects, also known as social objects) interconnected by edges (representing interactions, activity, or relatedness). A social networking system object may be a social networking system user, nonperson entity, content item, group, social networking system page, location, application, subject, concept or other social networking system object, e.g., a movie, a band, or a book. Content items can include anything that a social networking system user or other object may create, upload, edit, or interact with, e.g., messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Subjects and concepts, in the context of a social graph, comprise nodes that represent any person, place, thing, or idea.

A social networking system may enable a user to enter and display information related to the user's interests, education and work experience, contact information, demographic information, and other biographical information in the user's profile page. Each school, employer, interest (for example, music, books, movies, television shows, games, political views, philosophy, religion, groups, or fan pages), geographical location, network, or any other information contained in a profile page may be represented by a node in the social graph. A social networking system may enable a user to upload or create pictures, videos, documents, songs, or other content items, and may enable a user to create and schedule events. Content items and events may be represented by nodes in the social graph.

A social networking system may provide various means to interact with nonperson objects within the social networking system. For example, a user may form or join groups, or become a fan of a fan page within the social networking system. In addition, a user may create, download, view, upload, link to, tag, edit, or play a social networking system object. A user may interact with social networking system objects outside of the context of the social networking system. For example, an article on a news web site might have a "like" button that users can click. In each of these instances, the interaction between the user and the object may be represented by an edge in the social graph connecting the node of the user to the node of the object. A user may use location detection functionality (such as a GPS receiver on a mobile device) to "check in" to a particular location, and an edge may connect the user's node with the location's node in the social graph.

A social networking system may provide a variety of communication channels to users. For example, a social networking system may enable a user to email, instant message, or text/SMS message, one or more other users; may enable a user to post a message to the user's wall or profile or another user's wall or profile; may enable a user to post a message to a group or a fan page; or may enable a user to comment on an image, wall post or other content item created or uploaded by the user or another user. In least one embodiment, a user posts a status message to the user's profile indicating a current event, state of mind, thought, feeling, activity, or any other present-time relevant communication. A social networking system may enable users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection is a social network edge. Being friends in a social networking system may allow users access to more information about each other than would otherwise be available to unconnected users. For example, being friends may allow a user to view another user's profile, to see another user's friends, or to view pictures of another user. Likewise, becoming friends within a social networking system may allow a user greater access to communicate with another user, e.g., by email (internal and external to the social networking system), instant message, text message, phone, or any other communicative interface. Being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users.

In addition to explicitly establishing a connection in the social networking system, users with common characteristics may be considered connected (such as a soft or implicit connection) for the purposes of determining social context for use in determining the topic of communications. In at least one embodiment, users who belong to a common network are considered connected. For example, users who attend a common school, work for a common company, or belong to a common social networking system group may be considered connected. In at least one embodiment, users with common biographical characteristics are considered connected. For example, the geographic region users were born in or live in, the age of users, the gender of users and the relationship status of users may be used to determine whether users are connected. In at least one embodiment, users with common interests are considered connected. For example, users' movie preferences, music preferences, political views, religious views, or any other interest may be used to determine whether users are connected. In at least one embodiment, users who have taken a common action within the social networking system are considered connected. For example, users who endorse or recommend a common object, who comment on a common content item, or who RSVP to a common event may be considered connected. A social networking system may utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 2:
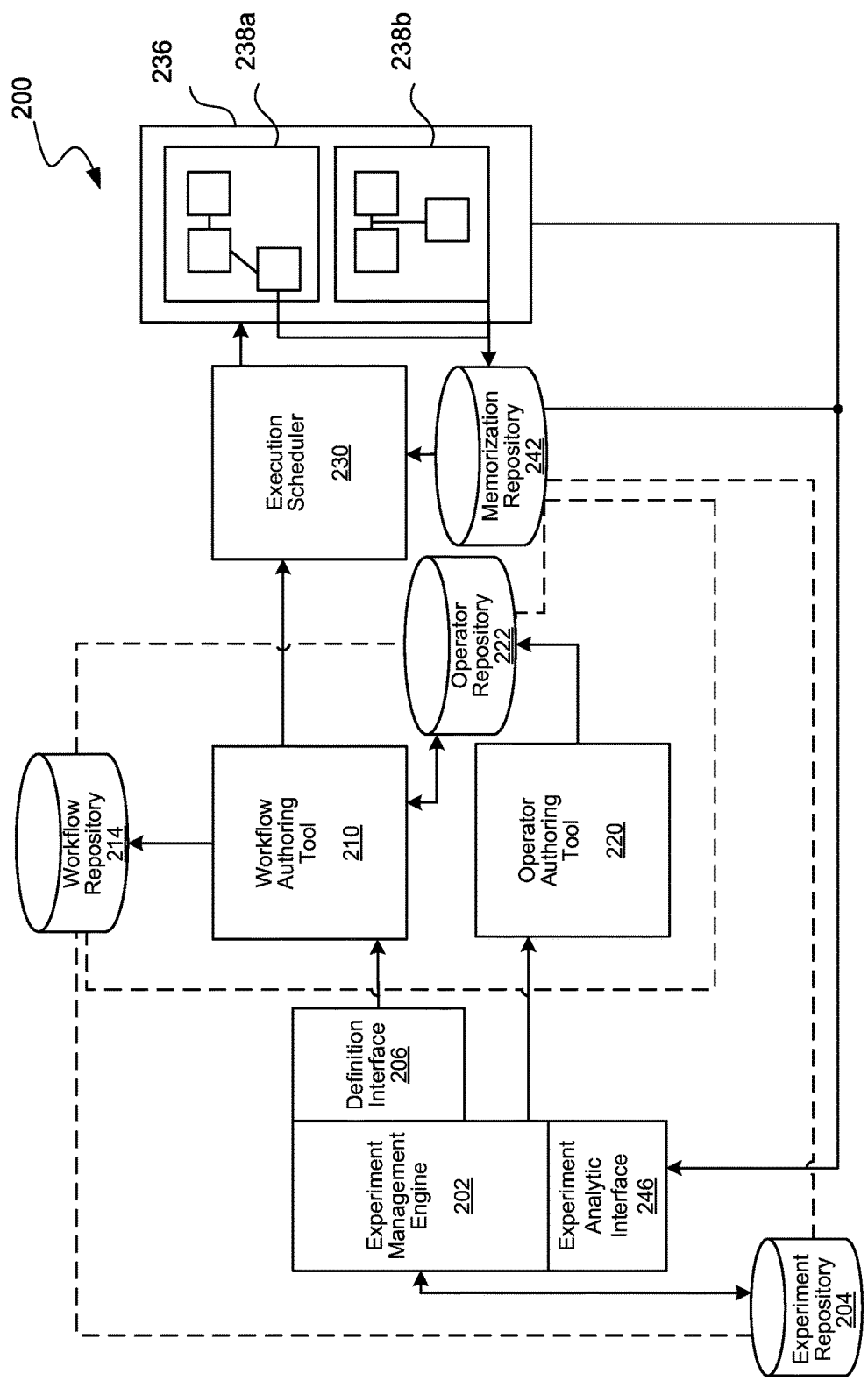
FIG. 2 is a block diagram illustrating a machine learning system that manages big data experiments, in accordance with various embodiments.

FIG. 2 is a block diagram illustrating a machine learning system 200 (e.g., the machine learning system 112 of FIG. 1) that manages big data experiments, in accordance with various embodiments. The machine learning system 200 can facilitate running of machine learning related processes in an application service system (e.g., the application service system 100 of FIG. 1). The application service system can run multiple application services and produce multiple streams of input data based on the service requests and service responses of the application services.

The machine learning system 200 includes an experiment management engine 202 (e.g., the experiment management engine 124 of FIG. 1). The experiment management engine 202 can manage an experiment repository 204 storing data of one or more previously executed or created or currently running experiments. The data for an experiment can include references to one or more workflows used in the experiment (e.g., including references to workflow related data in a workflow repository 214), one or more input datasets used in the experiment, one or more output results of the experiment (e.g., including references to output results in an memoization repository 242), rendered illustrations (e.g., video or still image representations) of the output results (e.g., including rendered illustrations in the memoization repository 242), or any combination thereof.

The experiment management engine 202 can generate a definition interface 206 to define an experiment. In some embodiments, the experiment management engine 202 can present the definition interface 206 as an internal website accessible to developers and analysts of the application service system. The definition interface 206 can query an operating user to define an experiment by indicating a title of the experiment, a description of the experiment, one or more application services associated with the experiment, a workflow for the experiment, or any combination thereof. The definition interface 206 can also create an experiment by querying the operating user to select a previous experiment from the experiment repository 204 to clone. Once a previous experiment is cloned into a new experiment, the definition interface 206 can receive modifications to the experiment parameters cloned from the selected previous experiment. In some embodiments, the definition interface 206 can create an experiment by querying the operating user to select an existing workflow from the workflow repository 214. Once an existing workflow is cloned into the new experiment, the definition interface 206 can receive modifications to the workflow attributes cloned from the selected existing workflow. The operating user can also fill in other experiment parameters other than the definition of a workflow.

In some embodiments, the definition interface 206 includes a search widget capable of identifying one or more workflows based on a user query of an input schema, an output schema, an input summary format, an output summary format, a title keyword, a description keyword, a tag keyword, a data processing operator keyword, or any combination thereof. The definition interface 206 can present one or more workflows for reviewing, editing, or cloning, that match or are associated with the user query. In some embodiments, the same or a different search widget is capable of identifying one or more data processing operators based on a user query of an input dataset, an input data source, an input schema, an output schema, an input summary format, an output summary format, or any combination thereof, that match one or more respective parameters of the identified data processing operators. The identified workflow and/or data processing operators can be selected to define and/or modify an experiment or a workflow.

A workflow can be defined through a workflow authoring tool 210 (e.g., the workflow authoring tool 126 of FIG. 1). For example, the workflow authoring tool 210 can generate an integrated development environment for scripting a workflow definition in text. In some embodiments, the workflow authoring tool 210 can import a workflow definition from a text file or based on one or more user selections. The workflow authoring tool 210 can compile the imported workflow definition into a workflow execution format (e.g., including interdependency graph of operators and associated code packages and resource constraints). In some embodiments, the workflow authoring tool 210 can import one or more experiment parameters and/or one or more workflow attributes from a text file or based on one or more user selections. The workflow authoring tool 210 can facilitate creation of a workflow from scratch or by cloning an existing workflow in the workflow repository 214 and making modifications to it.

To create a workflow, an operating user can indicate relationships between one or more data processing operators via the user interface of the workflow authoring tool 210. In some embodiments, the operating user can identify the data processing operators and indicate their relationships in a text file and import that to the workflow authoring tool 210. That is, the workflow authoring tool 210 can be used to add or remove data processing operators from a workflow and specify relationships between the data processing operators in the workflow. A relationship can be a directed relationship where one or more outputs of a first data processing operator is passed to a second data processing operator as one or more of its inputs. In some embodiments, more than one instance of a data processing operator can be defined within the workflow.

In several embodiments, the machine learning system 200 includes also an operator authoring tool 220. In some embodiments, the operator authoring tool 220 is part of the workflow authoring tool 210. In other embodiments, the operator authoring tool 220 is coupled to the workflow authoring tool 210 whenever an operating user indicates an intention to edit or create a data processing operator. The operator authoring tool 220 can also include a user interface (e.g., an IDE or a text editor) to facilitate definition of a data processing operator. For example, operator parameters that can be defined in the operator authoring tool 220 include an input schema, an output schema, an input summary format, an output summary format, a resource constraint (e.g., run-time memory requirement or network bandwidth requirement), data processing logics, code package requirements (e.g., these parameters can be device/operating system dependent), programming language indicator, code compiling parameters (e.g., these parameters can be dependent on the programming language used), or any combination thereof. A data processing operator can be an ephemeral operator that is defined specific for a particular workflow or a particular experiment. The operator authoring tool 220 can also set a data processing operator as a "production operator" for inclusion into other workflows or experiments with or without modifications. In some embodiments, all of the data processing operators are stored and tracked in the operator repository 222. In some embodiments, only the production operators are stored and tracked in the operator repository 222.

In several embodiments, an experiment in the experiment repository 204 can reference one or more workflows in the workflow repository 214 or vice versa (e.g., a workflow can make a reference to an experiment). In several embodiments, an experiment in the experiment repository 204 can reference one or more outputs or illustrations in the memoization repository 242, or vice versa (e.g., an output or illustration can make a reference to an experiment). In several embodiments, a workflow in the workflow repository 214 can reference one or more data processing operators in the operator repository 222, or vice versa (e.g., an operator can make a reference to a workflow).

After a workflow is defined, the workflow authoring tool 210 can compile the workflow definition into a workflow execution format (e.g., as previously described). The machine learning system 200 can include an execution scheduler engine (e.g., part of the workflow execution engine 128 of FIG. 1). The execution scheduler engine 230 can schedule to execute an experiment associated with one or more workflows. For each workflow, the execution scheduler engine 230 can select one or more computing environments in a backend computation pool 236 to execute the workflow. In some embodiments, the backend computation pool 236 can include multiple server farms (e.g., a server farm 238A, a server farm 238B, etc., collectively as the "server farms 238"). Each of the server farms 238 can be housed in a different data center and include one or more computing devices. The computing environments can be computing devices (e.g., instances of the computing device 600 of FIG. 6) or virtualized operating systems. The execution scheduler engine 230 can determine, based on the workflow execution format, which of the data processing operators are executed by which of the computing environments in the backend computation pool 236 and the order and constraints of executing the data processing operators. The execution scheduler engine 230 can also determine how data is to be shared amongst the data processing operators.

One or more data outputs produced from a computing environment executing at least one data processing operator can be stored in a memoization repository 242. Prior to committing resources to execute a data processing operator, the execution scheduler engine 230 can check with the memoization repository 242 to determine whether the process has already been run. The matching performed by the execution scheduler engine 230 can be exact, or with built-in flexibilities. For example, when exact matching is required, the execution scheduler engine 230 can determine whether or not an output stored in the memoization repository 242 is associated with the same input and the same version of the data processing operator. When flexible matching is allowed, the execution scheduler engine 230 can determine a match when the same or similar input is passed into the same version or a different version of the data processing operator to produce the memoized output. The memoized output can be output data or a rendered visualization/illustration. In some embodiments, the memoized outputs in the memoization repository 242 can make references to the associated workflow in the workflow repository 214 and/or the associated data processing operator in the operator repository 222, or vice versa (e.g., an operator and/or a workflow can make a reference to a memoized output).

In some embodiments, the experiment management engine 202 can generate and present an experiment analytic interface 246 to operating users to track one or more experiments. The experiment analytic interface 246 can present results of an experiment to the operating users. The results can be presented according to one or more summary formats defined by a workflow of the experiment. The results can be extracted by the memoization repository 242.

In some embodiments, upon completing a workflow of an experiment, the experiment analytic interface 246 can present interactive elements to trigger re-run of the experiment (e.g., without modification), creation of another experiment (e.g., a brand new experiment or a new experiment based on the original experiment with one or more modifications to its workflow attributes), or any combination thereof. In some embodiments, the experiment analytic interface 246 can present an interactive element to trigger deployment of the workflow as part of or a replacement for an application logic module. In some embodiments, the experiment analytic interface 246 can present an interactive element to trigger deployment of one or more data processing operators in the workflow to replace or to become part of an application logic module, or any combination thereof.

Functional components (e.g., engines, modules, and databases) associated with the application service system 100 and/or the machine learning system 200 can be implemented as circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). The systems, engines, or devices described may include additional, fewer, or different functional components for various applications.

FIG. 3 is an example screenshot of an experiment management interface (e.g., the definition interface 206 of FIG. 2) illustrating an interactive screen 300 to define a new workflow run, in accordance with various embodiments. A workflow run can be referred to as an experiment. The experiment management interface can be the user interface for a machine learning system (e.g., the machine learning system 200 of FIG. 2). The interactive screen 300 includes a panel 302 for specifying one or more run parameters associated with the new workflow run. A "run parameter" can be an experiment parameter as discussed above. A "run parameter" can be specific to a particular instance and/or session of executing a workflow. For example, the run parameters can include a "run name," one or more searchable tags associated with the new workflow run, a description of the new workflow run, one or more notes associated with the new workflow run, or any combination thereof.

The interactive screen 300 can also include a panel 304 for specifying one or more workflow run parameters. A "workflow run parameter" configures a workflow package (e.g., a production package or an ephemeral package specified before run-time) to the new workflow run. For example, the workflow run parameters can include a source path of the workflow package to configure, a unique name or identification of the workflow package, one or more input arguments to the workflow package, a package version of the workflow package to use (e.g., when the workflow package has multiple versions stored in a workflow repository), or any combination thereof. In some embodiments, the interactive screen 300 can include a trigger element 306 to start the new workflow run.

Here, a workflow run is illustrated as being launched via a user interface. There are, however, other modes for authoring and executing workflows. In one example, workflow authoring and/or execution can be done via an API remotely. In another example, the entire machine learning system can be condensed into a local environment with limited computational resource for development testing. Authoring and/or workflow execution commands can be executed from a local computer. In some embodiments, execution of a workflow can also happen on a developer's local computer or a local computing sandbox (e.g., one or more computing devices). All data produced from this local run instance can be saved locally and isolated from the production databases.

Figure 7A:
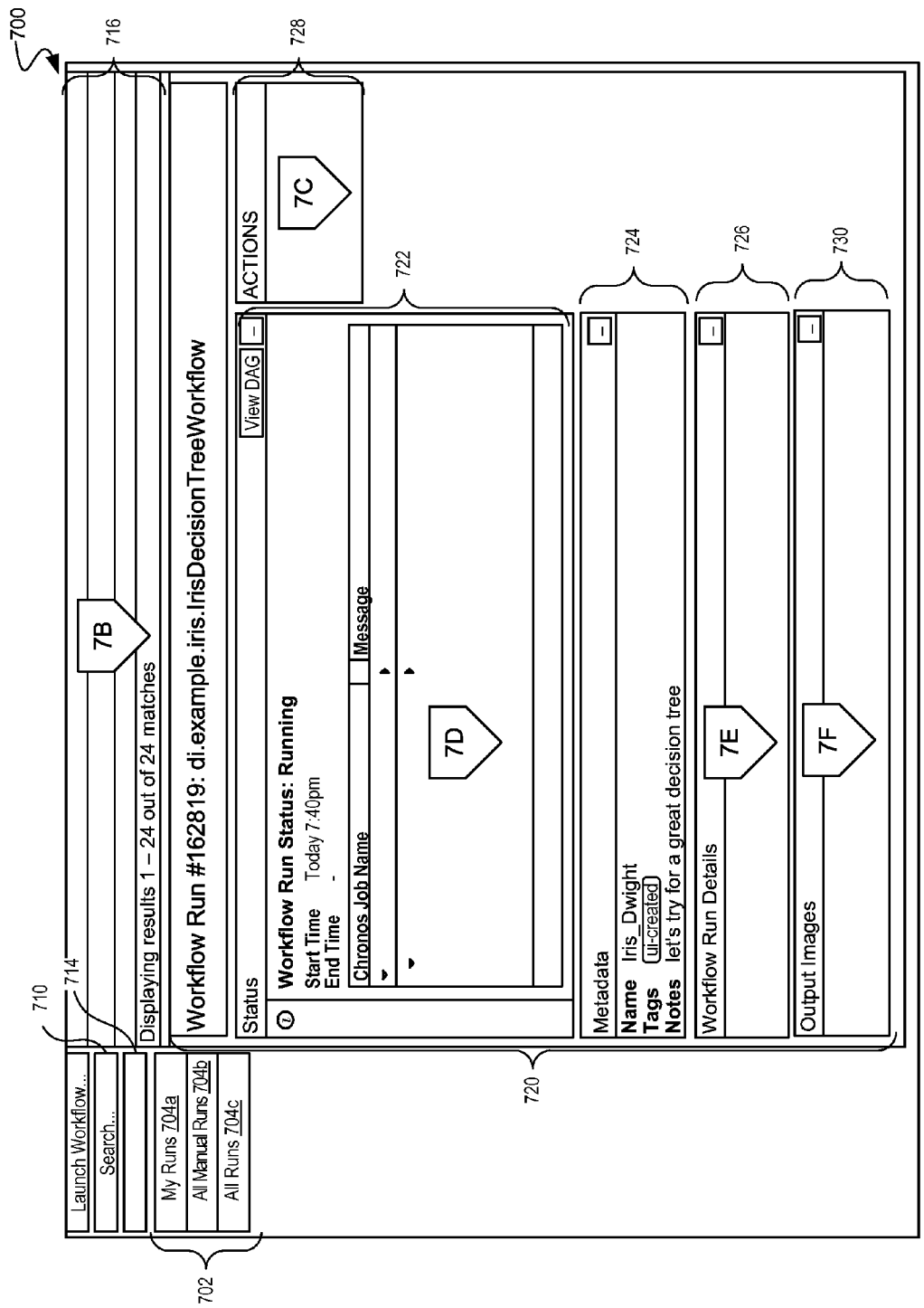
FIG. 7A is an example screenshot of the experiment management interface illustrating an interactive screen to define parameters associated with the new workflow run, in accordance with various embodiments.
Figure 7E:
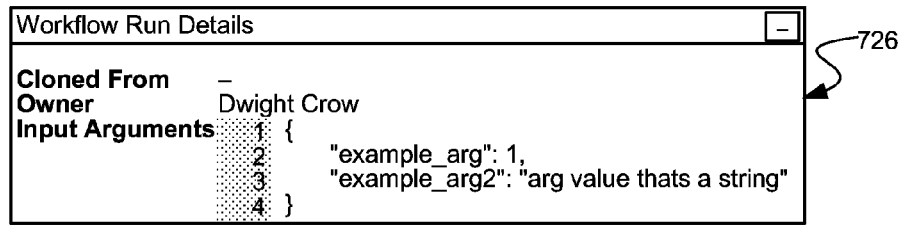
Figure 7F:
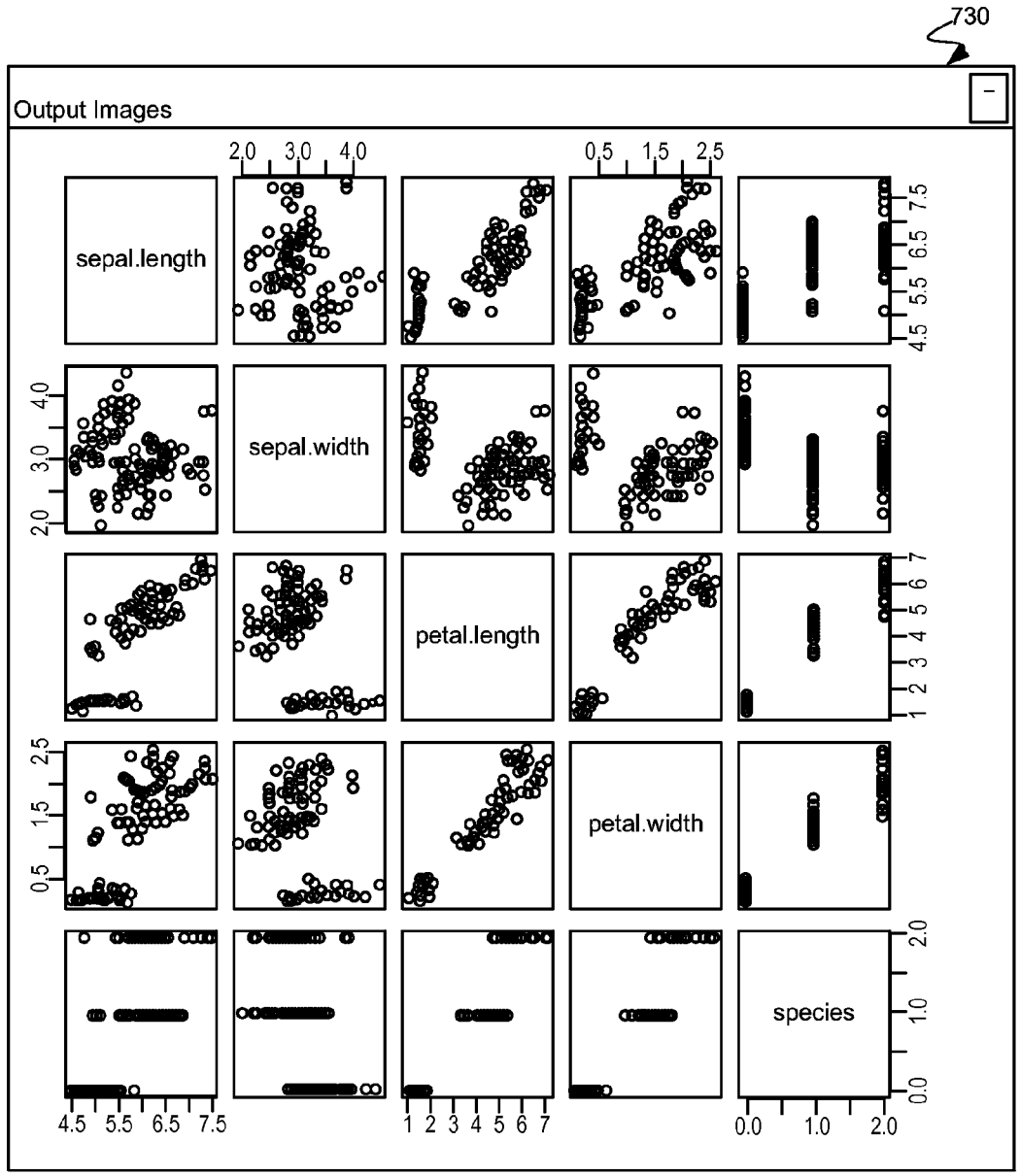

FIG. 7A is an example screenshot of the experiment management interface illustrating an interactive screen 700 to monitor and manage workflow runs, in accordance with various embodiments. FIGS. 7B-7F are diagrams illustrating detailed portions of the interactive screen 700 of FIG. 7A.

In this example, the interactive screen 700 includes a directory panel 702. The directory panel 702 enables an operating user to monitor and manage workflow runs associated with the operating users in a "My Runs" directory 704A. The directory panel 702 enables the operating user to monitor and manage all manual workflow runs performed on the machine learning system in a "All Manual Runs" directory 704B. The directory panel 702 enables the operating user to monitor and manage all workflow runs performed on the machine learning system in a "All Runs" directory 704C.

In this example, the interactive screen 700 also includes a search panel 340. For example, the search panel 710 can include a search initiation element 712 to initiate a search. The search panel 710 can include a search box 714 to enter one or more keywords associated with one or more workflow runs that the operating user is interested in. To perform the search, the experiment management interface can query a workflow repository (e.g., the workflow repository 214 of FIG. 2) or an experiment repository (e.g., the experiment repository 204 of FIG. 2) to match the keywords to one or more tags associated with the workflow runs. The search panel 710 can include a search result window 716. The search result window 716 can list the workflow runs matching the keywords and its associated properties and parameters (e.g., workflow run ID, provenance history, workflow package path, workflow run name, execution status, execution and time, execution start time, the tags associated with each workflow run, or any combination thereof).

In this example, the interactive screen 700 further includes a monitor dashboard 720. The monitor dashboard 720 can present information associated with a single workflow run. The monitor dashboard 720 can include a status panel 722, a metadata panel 724, a run detail panel 726, an action panel 728, an output image panel 730, or any combination thereof. The status panel 722 presents the status of the workflow run including details of the execution session (e.g., start time and/or end time) and/or details of execution jobs delegated to one or more computing delegation nodes (e.g., physical or virtual computing devices or environments). The metadata panel 724 presents metadata associated with the workflow run. For example, the metadata panel 724 can present one or more name, tags, and/or notes associated with the workflow run. The run detail panel 726 presents workflow run parameters (e.g., part of experiment definition) and workflow attributes (e.g., part of workflow definition) associated with the workflow run.

The action panel 728 presents interactive elements that enables an operating user to take action against or involving the workflow run. In one example, the action panel 728 includes a clone workflow element 732 that triggers cloning of a workflow associated with the workflow run into a new workflow or a new workflow run. In one example, the action panel 728 includes a view workflow source code element 734 that triggers the experiment management interface to present raw text associated with workflow definition. In one example, the action panel 728 includes a link element 736 that presents or copies a local network address for accessing the interactive screen 700 associated with the workflow run. In one example, the action panel 728 includes cancellation element 738 that triggers the experiment management engine to cancel a workflow run (e.g., a running experiment) and remove it from schedule (e.g., notify the execution scheduler engine 230 of FIG. 2).

The output image panel 730 is a portion of the interactive screen 700 that present the rendered visualization/illustrations associated with the workflow run. For example, the visualizations can be one or more comparative illustrations (e.g., illustrations comparing one or more workflow runs/experiments), analytical illustrations (e.g., statistical representations of the output data), evaluative illustrations (e.g., representations of evaluative metrics ran on the output data or representations of the output data if the output data includes evaluative metrics), or any combination thereof.

FIG. 4 is a flow chart illustrating a method 400 of operating an experiment management engine (e.g., the experiment management engine 124 of FIG. 1), in accordance with various embodiments. The experiment management engine can be part of a machine learning system (e.g., the machine learning system 200 of FIG. 2) in an application service system (e.g., the application service system 100 of FIG. 1). At step 402, the experiment management engine can provide an experiment management interface. The experiment management engine can track previous experiments and/or currently running experiments in an experiment repository. The experiment management interface can present the previous experiments and/or existing workflows that are managed by the experiment management engine for review and/or cloning.

In some embodiments, the experiment management engine can generate the experiment management interface on an internal webserver accessible only within a private local area network (LAN) for developers and/or analysts of the application service system. In some embodiments, the experiment management engine can present the experiment management interface on a remote device via communication through an application programming interface (API) server. In some embodiments, the experiment management interface can extract previous workflows from a workflow repository (e.g., the workflow repository 214 of FIG. 2). The workflows in the workflow repository can each be represented by an interdependency graph (e.g., a directed graph) of one or more data processing operators.

At step 404, the experiment management engine can create a new experiment associated with a new workflow based on one or more user commands received at the experiment management interface. The user commands can indicate a user's intention to register a new experiment (e.g., run session) of the new workflow with the experiment management engine. For example, the experiment management engine can receive, via the experiment management interface, an experiment initialization command to create the new experiment based on an existing workflow in the machine learning system. The existing workflow can be part of the workflow repository. The existing workflow can be part of a previously executed experiment presented on the experiment management interface. For example, receiving the experiment initialization command can include receiving a user selection of a previous experiment that is associated with the existing workflow from amongst the presented previous experiments. The existing workflow may be one of the existing workflows presented on the experiment management interface. For example, receiving the experiment initialization command can include receiving a user selection of the existing workflow from amongst the existing workflows presented at the experiment management interface. For another example, the experiment management engine can receive, via the experiment management interface, an experiment initialization command to create the new experiment from a blank slate (e.g., from scratch).

At step 406, the experiment management engine can receive, via the experiment management interface, one or more inputs to define the new workflow. In the example of the new experiment being based on an existing workflow, the inputs can be one or more modifications to the existing workflow. Receiving the modifications can include, responsive to receiving the user selection, presenting a combination of at least a subset of parameters and/or attributes for the existing workflow for cloning or modification. The modifications can include: redefining an existing data processing operator used in the existing workflow, changing an input dataset to the existing workflow, changing an input data configuration (e.g., corresponding to which column, row, or part of the input dataset to use) to the existing workflow, removing an existing data processing operator used in the existing workflow, inserting an additional data processing operator into the existing workflow, defining the additional data processing operator from scratch, referencing a production data processing operator (e.g., from a production operator repository) as the additional data processing operator, or any combination thereof.

In the example of the new experiment being defined from scratch, the inputs can be definitional inputs of workflow attributes (e.g., to define a new workflow) and/or experiment parameters (e.g., to define a new workflow run/experiment). The definitional inputs, for example, can include identifications of one or more of input datasets, input data sources, data processing operators, input/output schemas, input/output summary formats, or any combination thereof. In some embodiments, the experiment management interface can provide an integrated development environment (IDE) and/or a text editor to modify an existing workflow or define a new workflow. For example, the experiment management engine can provide the IDE or the text editor in in the experiment management interface to enable an operating user to create, modify, or remove data processing operators from the new workflow. The modifications of the existing workflow can be received via the IDE or text editor. That is, the inputs to define the new workflow can be text inputs. The inputs can be one or more selections of workflow attributes and/or workflow run parameters from one or more lists presented on the experiment management interface. The selected workflow attribute or workflow run parameter can be selected from amongst known work attributes or workflow run parameters in the machine learning system (e.g., in the experiment repository and/or the workflow repository).

At step 408, the experiment management engine can track a version history of the new workflow. Similarly, the experiment management engine can track one or more version histories associated with the data processing operators of the new experiment. Tracking the version history of the new workflow can include identifying the existing workflow as a basis for the new workflow. The experiment management engine can also track a run history of one or more experiments conducted in the machine learning system using the new workflow and/or the existing workflow.

At step 410, the experiment management engine schedules the new workflow for execution by a dynamic pool of computing devices. In the example of the new experiment being based on an existing workflow, the experiment management engine can schedule the new workflow based on the modifications to the existing workflow. In the example of the new experiment defined from a blank slate, the experiment management engine can schedule the new workflow based on the definitional inputs.

At step 412, the experiment management engine renders one or more visualizations to facilitate analysis of the new experiment. For example, the visualizations can include an evaluative or analytical illustration of the output/result of the new experiment. The evaluative or analytical illustration can be generated based on the input summary format and/or the output summary format associated with the new workflow.

In another example, the visualizations can include a comparative illustration of the new experiment against at least a comparable experiment. The comparative illustration can be generated based on an input schema and/or an output schema of the new workflow. For example, when rendering the visualization, the experiment management engine can identify one or more comparable experiments for user selection. In one example, the comparable experiments can be identified based on input and output schemas of the workflows associated one or more experiments tracked in an experiment repository (e.g., the experiment repository 204 of FIG. 2). In this example, the output schemas of the comparable experiments match an output schema of the new workflow associated with the new experiment. In some cases, the input schemas of the comparable experiments also match the input schema of the new experiment and the new workflow associated therewith. In another example, the comparable experiments can be identified based on the version history of the new experiment. The version history can track a provenance chain of one or more experiments that are based on one another. The experiment management engine can identify the comparable experiments as one or more experiments within the same provenance chain as the new experiment.

The experiment management engine can receive a user selection of a target experiment from amongst the comparable experiments. Responsive to receiving the user selection, the experiment management engine then produces a comparison illustration between the experiment and the target experiment. The rendering of a comparison illustration can be based on a summary format dictated by the new workflow associated with the new experiment.

At step 414, the experiment management engine can update the new experiment in the experiment repository with the output results of the new experiment and the visualizations associated with the new experiment. In several embodiments, the experiment management engine can store and begin tracking the new experiment at the time of definition (e.g., after step 404). The experiment management engine can update the new experiment when the new experiment is modified, when the new experiment is scheduled, and/or when the new experiment is executed. The experiment management engine can generate and present the visualizations of the new experiment on the experiment management interface after the new workflow of the experiment has executed. The experiment management interface can present interactive elements to enable other experimenters (e.g., operating users of the machine learning system) to repeat the new experiment or run a modification of the new experiment for automatic comparison.

While processes or blocks are presented in a given order in FIG. 4, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least in part on that value or that computation.

Figure 5:
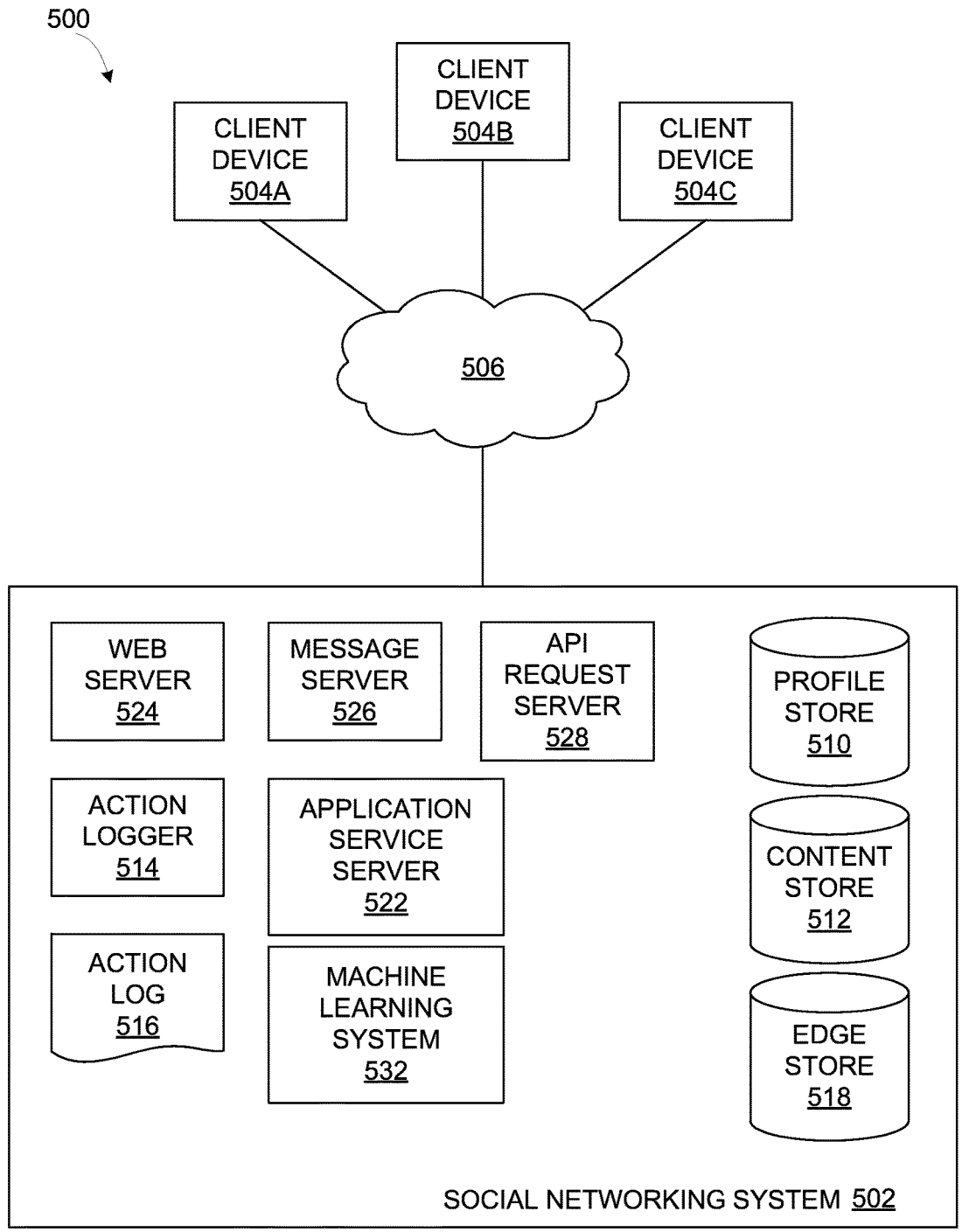
FIG. 5 is a high-level block diagram of a system environment suitable for a social networking system, in accordance with various embodiments.

FIG. 5 is a high-level block diagram of a system environment 500 suitable for a social networking system 502, in accordance with various embodiments. The system environment 500 shown in FIG. 5 includes the social networking system 502 (e.g., the application service system 100 of FIG. 1), a client device 504A, and a network channel 506. The system environment 500 can include other client devices as well, e.g., a client device 504B and a client device 504C. In other embodiments, the system environment 500 may include different and/or additional components than those shown by FIG. 5. The machine learning system 200 of FIG. 2 can be implemented in the social networking system 502.
Social Networking System Environment and Architecture The social networking system 502, further described below, comprises one or more computing devices storing user profiles associated with users (i.e., social networking accounts) and/or other objects as well as connections between users and other users and/or objects. Users join the social networking system 502 and then add connections to other users or objects of the social networking system to which they desire to be connected. Users of the social networking system 502 may be individuals or entities, e.g., businesses, organizations, universities, manufacturers, etc. The social networking system 502 enables its users to interact with each other as well as with other objects maintained by the social networking system 502. In some embodiments, the social networking system 502 enables users to interact with third-party websites and a financial account provider.

Based on stored data about users, objects and connections between users and/or objects, the social networking system 502 generates and maintains a "social graph" comprising multiple nodes interconnected by multiple edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 502 adds and/or modifies edges connecting the various nodes to reflect the interactions.

The client device 504A is a computing device capable of receiving user input as well as transmitting and/or receiving data via the network channel 506. In at least one embodiment, the client device 504A is a conventional computer system, e.g., a desktop or laptop computer. In another embodiment, the client device 504A may be a device having computer functionality, e.g., a personal digital assistant (PDA), mobile telephone, a tablet, a smart-phone or similar device. In yet another embodiment, the client device 504A can be a virtualized desktop running on a cloud computing service. The client device 504A is configured to communicate with the social networking system 502 via a network channel 506 (e.g., an intranet or the Internet). In at least one embodiment, the client device 504A executes an application enabling a user of the client device 504A to interact with the social networking system 502. For example, the client device 504A executes a browser application to enable interaction between the client device 504A and the social networking system 502 via the network channel 506. In another embodiment, the client device 504A interacts with the social networking system 502 through an application programming interface (API) that runs on the native operating system of the client device 504A, e.g., IOS® or ANDROID™.

The client device 504A is configured to communicate via the network channel 506, which may comprise any combination of local area and/or wide area networks, using both wired and wireless communication systems. In at least one embodiment, the network channel 506 uses standard communications technologies and/or protocols. Thus, the network channel 506 may include links using technologies, e.g., Ethernet, 802.11, worldwide interoperability for microwave access (WiMAX), 3G, 4G, CDMA, digital subscriber line (DSL), etc. Similarly, the networking protocols used on the network channel 506 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 506 may be represented using technologies and/or formats including hypertext markup language (HTML) or extensible markup language (XML). In addition, all or some of links can be encrypted using conventional encryption technologies, e.g., secure sockets layer (SSL), transport layer security (TLS), and Internet Protocol security (IPsec).

The social networking system 502 includes a profile store 510, a content store 512, an action logger 514, an action log 516, an edge store 518, an application service server 522, a web server 524, a message server 526, an application service interface (API) request server 528, a machine learning system 532, or any combination thereof. In other embodiments, the social networking system 502 may include additional, fewer, or different modules for various applications.

User of the social networking system 502 can be associated with a user profile, which is stored in the profile store 510. The user profile is associated with a social networking account. A user profile includes declarative information about the user that was explicitly shared by the user, and may include profile information inferred by the social networking system 502. In some embodiments, a user profile includes multiple data fields, each data field describing one or more attributes of the corresponding user of the social networking system 502. The user profile information stored in the profile store 510 describes the users of the social networking system 502, including biographic, demographic, and other types of descriptive information, e.g., work experience, educational history, gender, hobbies or preferences, location and the like. A user profile may also store other information provided by the user, for example, images or videos. In some embodiments, images of users may be tagged with identification information of users of the social networking system 502 displayed in an image. A user profile in the profile store 510 may also maintain references to actions by the corresponding user performed on content items (e.g., items in the content store 512) and stored in the edge store 518 or the action log 516.

A user profile may be associated with one or more financial accounts, enabling the user profile to include data retrieved from or derived from a financial account. In some embodiments, information from the financial account is stored in the profile store 510. In other embodiments, it may be stored in an external store.

A user may specify one or more privacy settings, which are stored in the user profile, that limit information shared through the social networking system 502. For example, a privacy setting limits access to cache appliances associated with users of the social networking system 502.

The content store 512 stores content items (e.g., images, videos, or audio files) associated with a user profile. The content store 512 can also store references to content items that are stored in an external storage or external system. Content items from the content store 512 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social networking system by displaying content related to users, objects, activities, or functionalities of the social networking system 502. Examples of social networking content items include suggested connections or suggestions to perform other actions, media provided to, or maintained by, the social networking system 502 (e.g., pictures or videos), status messages or links posted by users to the social networking system, events, groups, pages (e.g., representing an organization or commercial entity), and any other content provided by, or accessible via, the social networking system.

The content store 512 also includes one or more pages associated with entities having user profiles in the profile store 510. An entity can be a non-individual user of the social networking system 502, e.g., a business, a vendor, an organization, or a university. A page includes content associated with an entity and instructions for presenting the content to a social networking system user. For example, a page identifies content associated with the entity's user profile as well as information describing how to present the content to users viewing the brand page. Vendors may be associated with pages in the content store 512, enabling social networking system users to more easily interact with the vendor via the social networking system 502. A vendor identifier is associated with a vendor's page, thereby enabling the social networking system 502 to identify the vendor and/or to retrieve additional information about the vendor from the profile store 510, the action log 516 or from any other suitable source using the vendor identifier. In some embodiments, the content store 512 may also store one or more targeting criteria associated with stored objects and identifying one or more characteristics of a user to which the object is eligible to be presented.

The action logger 514 receives communications about user actions on and/or off the social networking system 502, populating the action log 516 with information about user actions. Such actions may include, for example, adding a connection to another user, sending a message to another user, uploading an image, reading a message from another user, viewing content associated with another user, attending an event posted by another user, among others. In some embodiments, the action logger 514 receives, subject to one or more privacy settings, content interaction activities associated with a user. In addition, a number of actions described in connection with other objects are directed at particular users, so these actions are associated with those users as well. These actions are stored in the action log 516.

In accordance with various embodiments, the action logger 514 is capable of receiving communications from the web server 524 about user actions on and/or off the social networking system 502. The action logger 514 populates the action log 516 with information about user actions to track them. This information may be subject to privacy settings associated with the user. Any action that a particular user takes with respect to another user is associated with each user's profile, through information maintained in a database or other data repository, e.g., the action log 516. Such actions may include, for example, adding a connection to the other user, sending a message to the other user, reading a message from the other user, viewing content associated with the other user, attending an event posted by another user, being tagged in photos with another user, liking an entity, etc.

The action log 516 may be used by the social networking system 502 to track user actions on the social networking system 502, as well as external website that communicate information to the social networking system 502. Users may interact with various objects on the social networking system 502, including commenting on posts, sharing links, and checking-in to physical locations via a mobile device, accessing content items in a sequence or other interactions. Information describing these actions is stored in the action log 516. Additional examples of interactions with objects on the social networking system 502 included in the action log 516 include commenting on a photo album, communications between users, becoming a fan of a musician, adding an event to a calendar, joining a groups, becoming a fan of a brand page, creating an event, authorizing an application, using an application and engaging in a transaction. Additionally, the action log 516 records a user's interactions with advertisements on the social networking system 502 as well as applications operating on the social networking system 502. In some embodiments, data from the action log 516 is used to infer interests or preferences of the user, augmenting the interests included in the user profile, and enabling a more complete understanding of user preferences.

Further, user actions that happened in particular context, e.g., when the user was shown or was seen accessing particular content on the social networking system 502, can be captured along with the particular context and logged. For example, a particular user could be shown/not-shown information regarding candidate users every time the particular user accessed the social networking system 502 for a fixed period of time. Any actions taken by the user during this period of time are logged along with the context information (i.e., candidate users were provided/not provided to the particular user) and are recorded in the action log 516. In addition, a number of actions described below in connection with other objects are directed at particular users, so these actions are associated with those users as well.

The action log 516 may also store user actions taken on external websites services associated with the user. The action log 516 records data about these users, including viewing histories, advertisements that were engaged, purchases or rentals made, and other patterns from content requests and/or content interactions.

In some embodiments, the edge store 518 stores the information describing connections between users and other objects on the social networking system 502 in edge objects. The edge store 518 can store the social graph described above. Some edges may be defined by users, enabling users to specify their relationships with other users. For example, users may generate edges with other users that parallel the users' real-life relationships, e.g., friends, co-workers, partners, and so forth. Other edges are generated when users interact with objects in the social networking system 502, e.g., expressing interest in a page or a content item on the social networking system, sharing a link with other users of the social networking system, and commenting on posts made by other users of the social networking system. The edge store 518 stores edge objects that include information about the edge, e.g., affinity scores for objects, interests, and other users. Affinity scores may be computed by the social networking system 502 over time to approximate a user's affinity for an object, interest, and other users in the social networking system 502 based on the actions performed by the user. Multiple interactions of the same type between a user and a specific object may be stored in one edge object in the edge store 518, in at least one embodiment. In some embodiments, connections between users may be stored in the profile store 510. In some embodiments, the profile store 510 may reference or be referenced by the edge store 518 to determine connections between users. Users may select from predefined types of connections, or define their own connection types as needed.

The web server 524 links the social networking system 502 via a network to one or more client devices; the web server 524 serves web pages, as well as other web-related content, e.g., Java, Flash, XML, and so forth. The web server 524 may communicate with the message server 526 that provides the functionality of receiving and routing messages between the social networking system 502 and client devices. The messages processed by the message server 526 can be instant messages, email messages, text and SMS (short message service) messages, photos, or any other suitable messaging technique. In some embodiments, a message sent by a user to another user can be viewed by other users of the social networking system 502, for example, by the connections of the user receiving the message. An example of a type of message that can be viewed by other users of the social networking system besides the recipient of the message is a wall post. In some embodiments, a user can send a private message to another user that can only be retrieved by the other user.

The API request server 528 enables external systems to access information from the social networking system 502 by calling APIs. The information provided by the social network may include user profile information or the connection information of users as determined by their individual privacy settings. For example, a system interested in predicting the probability of users forming a connection within a social networking system may send an API request to the social networking system 502 via a network. The API request server 528 of the social networking system 502 receives the API request. The API request server 528 processes the request by determining the appropriate response, which is then communicated back to the requesting system via a network.

The application service server 522 can implement at least one application service, for example, one of the application services 102 of FIG. 1. In several embodiments, the social networking system 502 can include multiple application service servers implementing multiple application services.

The machine learning system 532 can be the machine learning system 200 of FIG. 2. The machine learning system 532 can enable developer/analyst users to define, modify, track, schedule, execute, compare, analyze, evaluate, and/or deploy one or more workflows associated with running machine learning training and experiments corresponding to one or more application services of the social networking system 502. The machine learning system 532 can also enable developer/analyst users to modularly produce new workflows to refine machine learning models and to evaluate the efficacy of the machine learning models.

Functional components (e.g., circuits, devices, engines, modules, and data storages, etc.) associated with the application service system 100 of FIG. 1, the machine learning system 200 of FIG. 2, and/or the social networking system 502 of FIG. 5, can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 6:
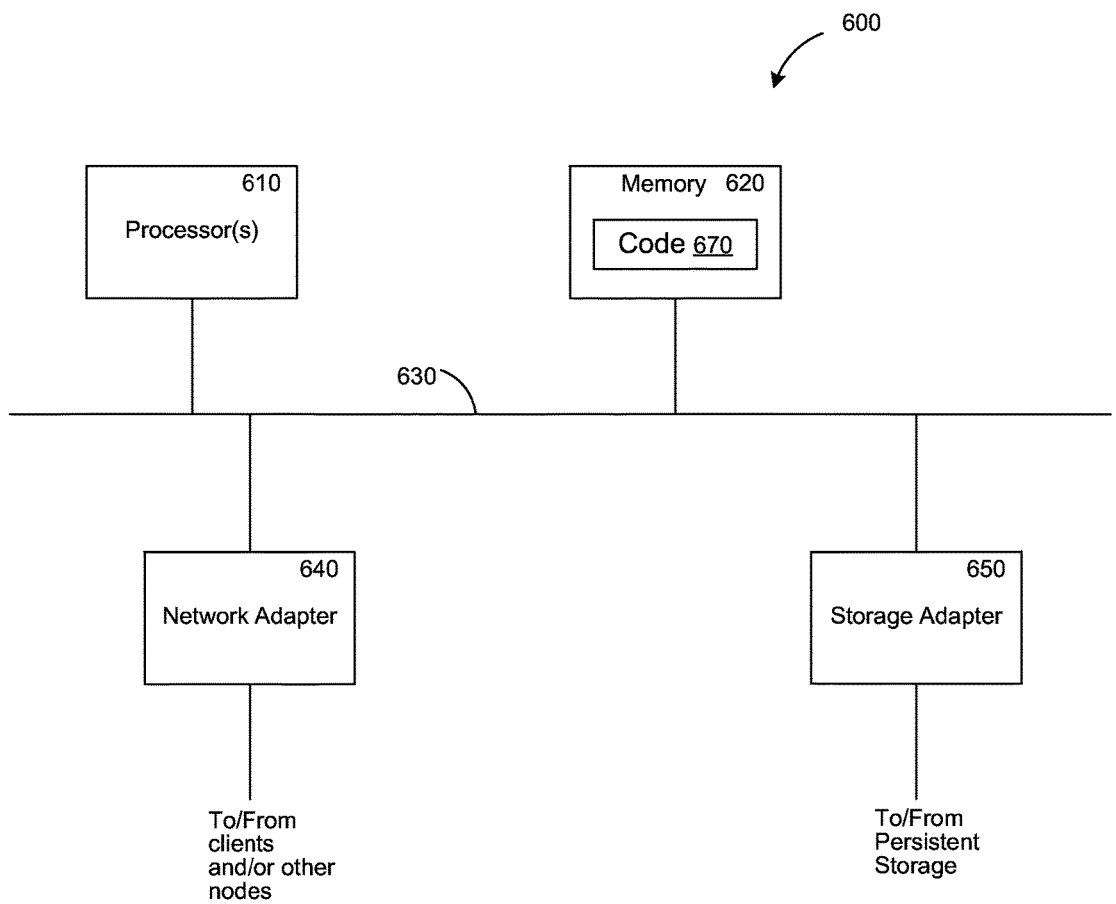
FIG. 6 is a block diagram of an example of a computing device, which may represent one or more computing device or server described herein, in accordance with various embodiments

FIG. 6 is a block diagram of an example of a computing device 600, which may represent one or more computing device or server described herein, in accordance with various embodiments. The computing device 600 can be one or more computing devices that implement the application service system 100 of FIG. 1 and/or the machine learning system 200 of FIG. 2. The computing device 600 can execute at least part of the method 400 of FIG. 4. The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; and/or optical storage media; flash memory devices), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. Reference in this specification to where a result of an action is "based on" another element or feature means that the result produced by the action can change depending at least on the nature of the other element or feature.

What is claimed is:

1. A computer-implemented method for promoting the design and execution of machine learning processes by enabling re-use of existing workflows, the method comprising:

generating an experiment management user interface to present existing workflows that ran on a machine learning system, wherein each existing workflow is represented by an interdependency graph of one or more data processing operators, the interdependency graph defines a pipeline of the data processing operators that converts an input dataset specified by an input schema of the existing workflow into an output specified by an output schema of the existing workflow;

receiving from a user, via the experiment management user interface and with the machine learning system, an experiment initialization command to create a new experiment associated with a new workflow, wherein the experiment initialization command includes a selection of an existing workflow in the machine learning system;

receiving from the user, one or more modifications to the existing workflow via the experiment management user interface, comprising:

adding at least one data processing operator to the one or more data processing operators of the existing workflow; or removing at least one data processing operator from the one or more data processing operators of the existing workflow;

generating, based on the received modifications, an updated pipeline of the one or more data processing operators including the added at least one data processing operator or excluding the removed at least one data processing operator, wherein the generating the updated pipeline is based on input and output schemas of the one or more data processing operators; and causing execution of the generated new workflow by a dynamic pool of computing devices, based on the updated pipeline, by causing at least a first of the one or more data processing operators to execute on a first computing device, of the dynamic pool of computing devices, and causing at least a second of the one or more data processing operators to execute on a second computing device, of the dynamic pool of computing devices, that is different from the first computing device, and wherein causing the execution involves facilitating one or more of: load-balancing, resource consumption minimization, avoiding bottlenecks, avoiding errors, avoiding inconsistencies, or any combination thereof; and generating a visualization to facilitate analysis of the new experiment based on an input schema or an output schema of the new workflow.

2. The computer-implemented method of claim 1, wherein generating the experiment management user interface includes exposing the experiment management user interface usable to identify previously executed experiments on the machine learning system; and wherein receiving the experiment initialization command from the user includes receiving a user selection of a previous experiment associated with the existing workflow.

3. The computer-implemented method of claim 1, wherein said receiving from the user the experiment initialization command includes receiving a user selection of the existing workflow at the experiment management user interface; and wherein said receiving the modifications includes, responsive to receiving the user selection, presenting a combination of at least a subset of parameters and attributes of the existing workflow for cloning or modification.

4. The computer-implemented method of claim 1, wherein the modifications further include redefining an existing data processing operator used in the existing workflow.

5. The computer-implemented method of claim 1, wherein the modifications further include changing an input dataset to the existing workflow.

6. The computer-implemented method of claim 1, wherein the modifications further include changing an input data usage parameter to the existing workflow.

7. The computer-implemented method of claim 1, wherein the modifications further include providing a definition of the added data processing operator.

8. The computer-implemented method of claim 1, wherein the modifications include identifying a reference to a production data processing operator from a production operator library, as the added data processing operator.

9. The computer-implemented method of claim 1, further comprising rendering an integrated development environment (IDE) text editor in the experiment management user interface to enable modification to the interdependency graph of the data processing operators, wherein the modifications are received via the IDE text editor.

10. The computer-implemented method of claim 1, further comprising tracking a version history of the new workflow, wherein the version history identifies the existing workflow as a basis for the new workflow.

11. The computer-implemented method of claim 1, wherein generating the visualization includes:

identifying one or more comparable experiments based on output schemas of one or more experiments tracked in an experiment repository in the machine learning system, wherein the output schemas of the comparable experiments match an output schema of the new experiment; and responsive to a user selection of a target comparable experiment, rendering the visualization to compare the new experiment and the target comparable experiment, wherein said rendering is based on a summary format dictated by the new workflow associated with the new experiment.

12. The computer-implemented method of claim 1, wherein generating the visualization includes:

identifying one or more comparable experiments for user selection based on a version history of the new experiment, wherein the version history tracks a provenance chain of one or more experiments that are based on one another;

receiving a user selection of a target comparable experiment from amongst the comparable experiments; and responsive to receiving the user selection, rendering a visualization to compare the new experiment and the target comparable experiment.

13. A computer readable data memory storing computer-executable instructions that, when executed, cause a computer system to perform a computer-implemented method for promoting the design and execution of machine learning processes by enabling efficient compilation of existing data processing operators, the method, comprising:

generating an experiment management user interface to facilitate machine learning experimentations in a machine learning system;

registering an experiment with an experiment management engine of the machine learning system;

receiving from a user, via an integrated development environment of the experiment management user interface, a workflow definition text that defines a new workflow, wherein the workflow definition text describes an interdependency graph of one or more data processing operators;

compiling the new workflow by generating, based on the workflow definition text, a pipeline of the one or more data processing operators, wherein the generating the pipeline of the one or more data processing operators includes selecting at least one existing data processing operator, of the one or more data processing operators, from a pool of existing data processing operators and incorporating the existing data processing operator into the pipeline based on input and output schemas defined for the existing data processing operator:

causing execution of the generated new workflow by a dynamic pool of computing devices, based on the pipeline, by facilitating one or more of load-balancing, resource consumption minimization, avoiding bottlenecks, avoiding errors, avoiding inconsistencies, or any combination thereof; and generating a visualization schema to facilitate analysis of the experiment based on an input schema or an output schema of the new workflow.

14. The computer readable data memory of claim 13, wherein the workflow definition text is received as a text string from a user.

15. The computer readable data memory of claim 13, wherein the workflow definition text is received from a conversion process that receives one or more selections of: an input dataset, a data processing parameter, one or more data processing operators, an experiment report configuration, or any combination thereof, that is known in a workflow repository of the machine learning system, and converts the selections into the workflow definition text.

16. A computer readable data memory storing computer-executable instructions that, when executed, cause a computer system to perform a computer-implemented method comprising:

instructions for generating an experiment management user interface to facilitate machine learning experimentations in a machine learning system;

instructions for registering an experiment with an experiment management engine of the machine learning system;

instructions for receiving from a user, via an integrated development environment of the experiment management user interface, a workflow definition text that defines a new workflow, wherein the workflow definition text describes an interdependency graph of one or more data processing operators;

instructions for compiling the new workflow for execution on a dynamic pool of computing devices;

instructions for generating a visualization schema to facilitate analysis of the experiment based on an input schema or an output schema of the new workflow;

instructions for storing the experiment in an experiment repository of the machine learning system; and instructions for presenting the experiment, after the new workflow of the experiment has executed, at the experiment management user interface to enable another experimenter to repeat the experiment or repeat a modification of the experiment for automatic comparison.

17. A computer system for promoting the design and execution of machine learning processes by enabling re-use of existing workflows, the computer system comprising:

an experiment repository configured to store machine learning experiments previously executed on a machine learning system;

an experiment management engine configured to generate an experiment definition user interface for defining a new experiment and at least an associated workflow and an experiment visualization interface for analyzing a result of the new experiment, wherein the associated workflow is represented by an interdependency graph of one or more data processing operators; and an experiment scheduler engine configured to cause execution of the experiment via a pool of computing devices and distribute one or more code packages to at least a subset of the pool of computing devices, by causing at least a first of the code packages to execute on a first computing device of the pool of computing devices and causing at least a second of the code packages to execute on a second computing device, of the pool of computing devices, that is different from the first computing device;

wherein the experiment definition user interface enables an experimenter to register the new experiment with a machine learning system, wherein the new experiment is based on one of the previous machine learning experiments and is created by generating an updated pipeline based on a modification of one or more data processing operators of the one of the previous machine learning experiments, wherein the generating the updated pipeline is based on input and output schemas of the modified one or more data processing operators, wherein the previous machine learning experiment is associated with an existing workflow represented by an interdependency graph of the one or more data processing operators; and wherein the experiment visualization interface generates a visualization image comparing a first resulting output of a comparable previous experiment and a second resulting output of running the new experiment according to a visualization schema based on an input schema or an output schema of the associated workflow.

18. The computer system of claim 17, wherein the experiment definition user interface includes a search widget capable of identifying one or more workflows based on a user query of an input dataset, an input data source, an input schema, an output schema, an input summary format, an output summary format, or any combination thereof, that match one or more respective parameters of the identified workflows.

19. The computer system of claim 17, wherein the experiment definition user interface includes a search widget capable of identifying one or more data processing operators based on a user query of an input data set, an input data source, an input schema, an output schema, an input summary format, an output summary format, or any combination thereof, that match one or more respective parameters of the identified data processing operators.

* * * * *